July 31, 1923. 1,463,523
K. A. WYATT
LIGHTNING PROTECTION APPARATUS FOR OIL TANKS
Filed May 24, 1921  2 Sheets-Sheet 1
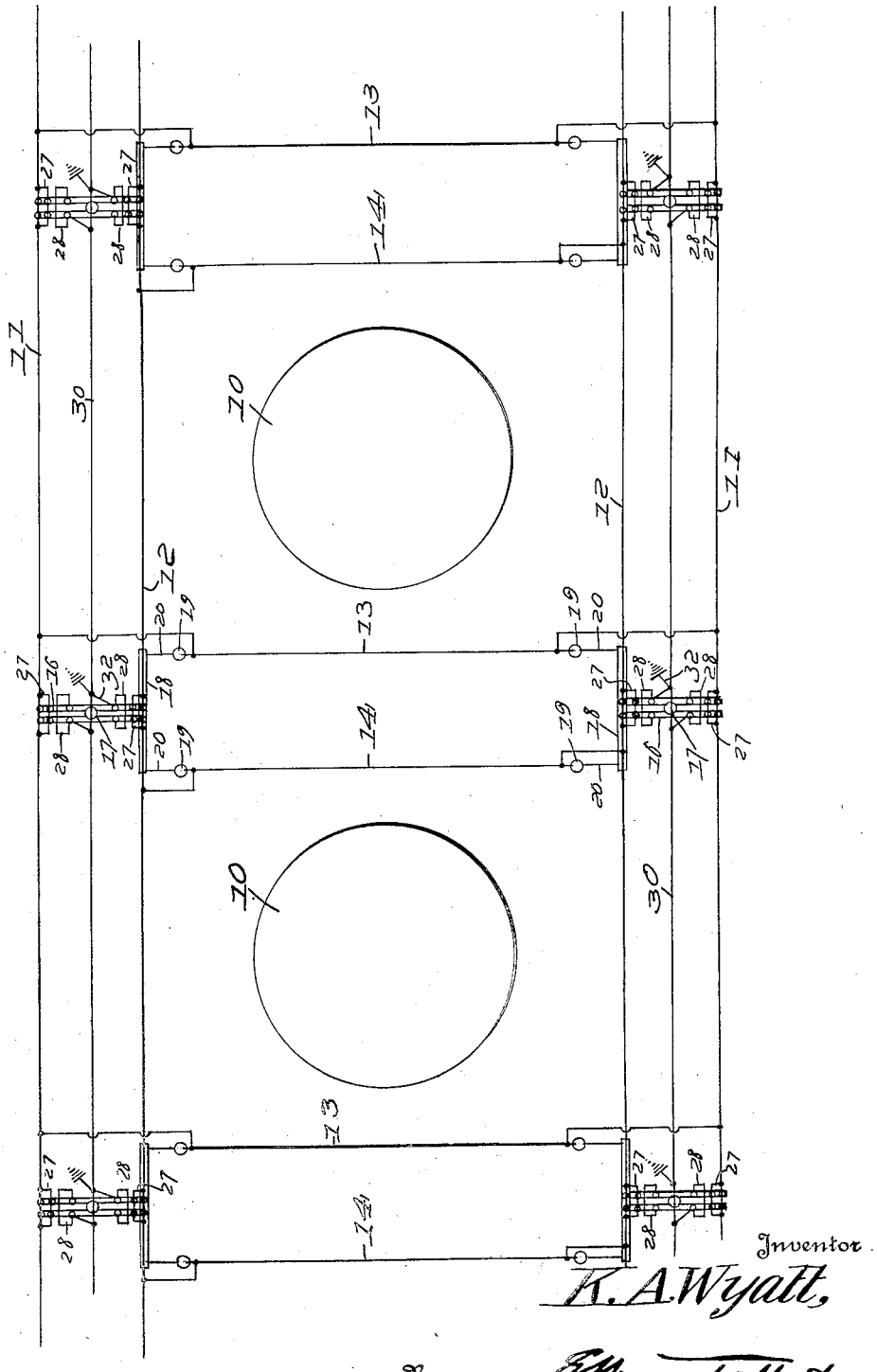

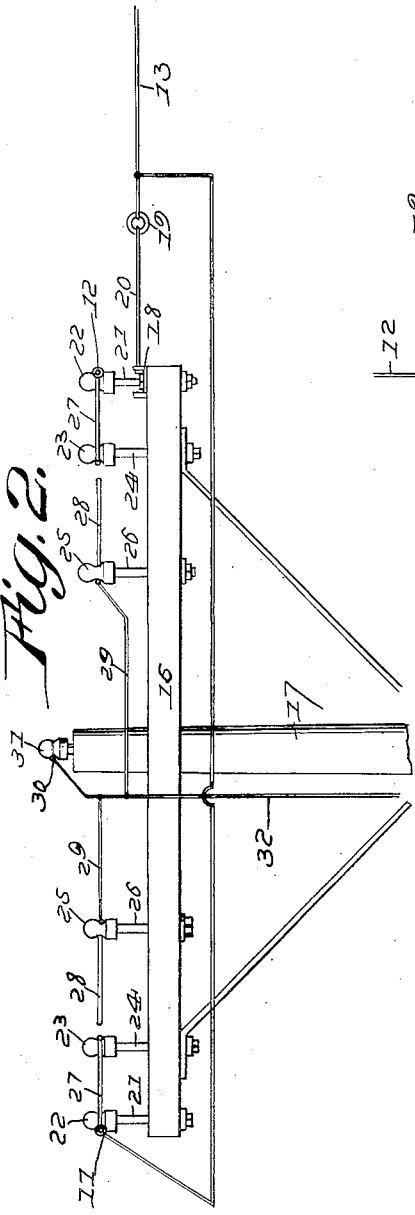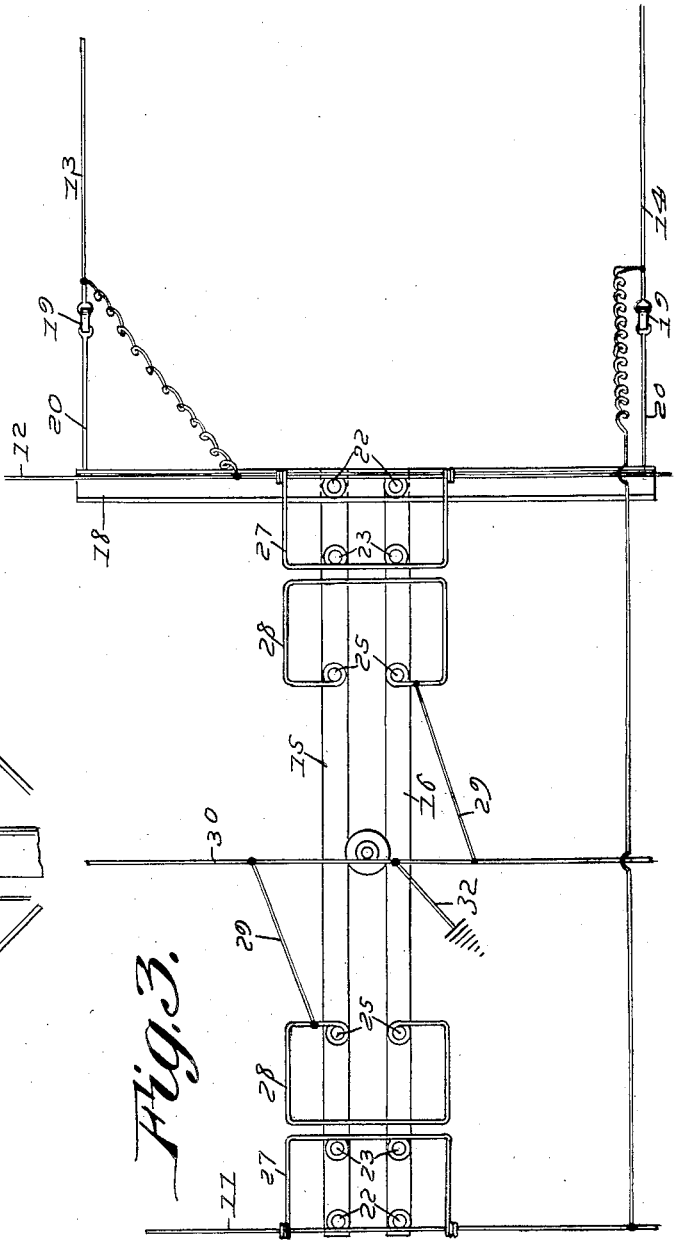

Patented July 31, 1923.

1,463,523

UNITED STATES PATENT OFFICE.

KINCHEN A. WYATT, OF DALLAS, TEXAS.

LIGHTNING PROTECTION APPARATUS FOR OIL TANKS.

Application filed May 24, 1921. Serial No. 472,296.

*To all whom it may concern:*

Be it known that KINCHEN A. WYATT, a citizen of the United States of America, residing at Dallas, in the county of Dallas and State of Texas, has invented new and useful Improvements in Lightning Protection Apparatus for Oil Tanks, of which the following is a specification.

The purpose of the invention is to provide means for the protection of oil tanks against lightning and to this end contemplates the formation of a zone in which the tanks are situated, the zone being bounded by high tension electrical conductors in connection with which lightning discharging means are provided for the passage of a lightning stroke to the ground. The purpose of the high tension conductors is to create a stress in the vicinity of the tanks which will induce the lightning to take the high tension lines and thence pass to earth through suitable arresting means.

Illustrated and described in a specific embodiment, the invention is not to be restricted to such. The right is reserved to make such changes or alterations as the actual reduction to practice may suggest, in so far as such changes or alterations are compatible in spirit with the annexed claims.

In the accompanying drawings:

Figure 1 is a plan view of the invention.

Figure 2 is a detail side elevational view enlarged of the upper end of the poles and its attendant cross arms.

Figure 3 is a top plan view of the structure of Figure 2.

The oil tanks 10 are disposed in a zone bounded laterally by the high tension conductors 11 and 12 which are interconnected at the ends of the zone and between the tanks by transverse conductors 13 and 14. The high tension conductors are carried on cross arms 15 and 16 disposed respectively on opposite sides of the poles 17 but arranged in parallelism and straddled at their inner ends—that is, the ends pointing towards the poles or cross arms on the opposite sides of the tank—by channel irons 18, the channel irons serving as means by which the strain insulators 19 are secured by means of anchoring bars 20. Since the transverse conductors 13 and 14 connect the two high tension lines in parallel, the whole system may be energized by connecting either one of the high tension lines to a source of supply, such as a high tension transmission circuit, in which case the conductors 11 and 12 would be connected respectively to the two sides of the high tension transmission line. If the energy is to be supplied from a low tension line, a step-up transformer may be employed and interposed in the connection between the conductors 11 and 12 and their points of connection with the energizing circuit.

The cross arms carry the usual insulator pins 21 and the insulators 22 to which the lines 11 and 12 are connected and in addition support insulators 23 carried on pins 24, as well as insulators 25 supported on pins 26. Connected with the lines 11 and 12 adjacent the insulators 22 are elements 27 of lightning arresters, these elements being of the U-shaped construction shown and being supported on the insulators 23, at the same time being connected with the lines 11 and 12. They are in the form of heavy bars made of the well known so called non-arcing metal. The insulators 25 carry the complemental elements 28 of the lightning arresters, also made of non-arcing metal and in the form of bars U-shaped in plan with a portion of the bar 28 paralleling the corresponding portion of the bar 27. The elements 28 of the arresters are connected by means of conductors 29 with messenger wires 30 spanning the several poles 23 and supported from insulators 31 carried at the tops of the poles, ground wires 32 being carried over the messenger wire 30 to the ground and a firm ground connection effected in any one of the conventional ways.

The very high potential existent in the conductors 11 and 12 creates a tension in the atmosphere tending to induce any lightning discharges to the conductors or at least to the messenger wires 30. If the discharges strike the messenger wire they pass quickly to the ground over the ground wires 32. If they strike either of the high tension wires, they pass to the arrester elements 27, jumping the gaps between them and the elements 28 and thence pass to the ground over one of the ground wires, the following arc being broken or choked by the whiff or non-conducting oxide thrown off in its passage.

Having described the invention, what is claimed as new and useful, is:—

1. Means for the protection of oil tanks against lightning consisting in combination with a battery of tanks, of high tension lines disposed on opposite sides of the battery, transverse conductors interconnecting corresponding sides of the high tension lines between individual tanks and at the ends of the battery, grounding conductors, and lightning arresters interposed between the grounded conductors and both sides of the high tension line.

2. Means for the protection of oil tanks against lightning consisting of high tension lines disposed on opposite sides of the oil tanks, poles and associated cross arms on which the high tension lines are carried, transverse conductors interconnecting corresponding sides of the high tension lines, grounded conductors, and lightning arresters interposed between the grounded conductors and both sides of the high tension lines.

3. Means for the protection of oil tanks against lightning consisting of poles and associated cross arms disposed at intervals on both sides of the tanks, high tension conductors spanning the cross arms, channel irons disposed in the direction of the length of the lines and connected to the cross arms at the inner ends of the latter, transverse lines connecting corresponding sides of the high tension lines, strain insulators anchored to the channel irons and supporting the transverse lines, grounded conductors carried by the poles, and lightning arresters interposed between both sides of the high tension lines and the grounded conductors.

4. Means for the protection of oil tanks against lightning consisting of poles and associated cross arms disposed at intervals on opposite sides of the tanks, high tension lines spanning the cross arms, transverse lines interconnecting corresponding sides of the high tension lines, and lightning arresters interposed between both sides of the high tension lines and the grounded conductors and consisting of substantially U-shaped bars made of non-arcing metal disposed with portions of the complemental members of the arresters in parallel in the manner and for the purpose specified.

In testimony whereof he affixes his signature.

KINCHEN A. WYATT.